Fig. 1

INVENTORS
Ronald H. Craig &
Robert Bruderly
ATTORNEY

April 13, 1965

R. H. CRAIG ET AL 3,178,642

ELECTRICAL TESTERS HAVING MEANS FOR SUPPLYING THREE-PHASE
VOLTAGE OF ADJUSTABLE MAGNITUDE AND POLARITY
FOR TESTING POLYPHASE ELECTRICAL APPARATUS

Filed Nov. 18, 1959

United States Patent Office 3,178,642
Patented Apr. 13, 1965

3,178,642
ELECTRICAL TESTERS HAVING MEANS FOR SUPPLYING THREE-PHASE VOLTAGE OF ADJUSTABLE MAGNITUDE AND POLARITY FOR TESTING POLYPHASE ELECTRICAL APPARATUS
Ronald H. Craig, Hempfield Township, Westmoreland County, and Robert E. Bruderly, Rankin, Pa., assignors to Westinghouse Electric Corporation, East Pittsburgh, Pa., a corporation of Pennsylvania
Filed Nov. 18, 1959, Ser. No. 853,940
12 Claims. (Cl. 324—73)

This invention relates to electrical testers and it has particular relation to electrical testers for testing polyphase network protectors.

Network protectors are well known in the art. They are employed for connecting a secondary network circuit or grid to a plurality of feeder circuits. A typical network protector includes a circuit breaker, a master relay, a phasing relay, and sometimes a desensitizing relay. The circuit breaker is controlled to connect its associated feeder circuit to the network circuit or grid when the electrical conditions are such that power will flow from the associated feeder circuit to the grid. The circuit breaker is controlled to disconnect its associated feeder circuit from the secondary network or grid when conditions are such that power flows through the network protector towards the associated feeder circuit.

In order to make certain that a network protector is in good operating conditions, it should be tested thoroughly at intervals. However, the lack of suitable and convenient test equipment has impeded the regular and thorough testing of such network protectors.

One approach to the problem of testing a network protector is illustrated in the Johnson Patent 2,376,775 which issued May 22, 1945. The equipment shown in the Johnson patent, in effect, employs a single-phase technique for testing the polyphase network protector.

In accordance with the invention, a polyphase network protector is energized from a polyphase source to subject the protector to tests under conditions similar to the conditions under which the polyphase network protector normally operates. Testing equipment embodying the invention is designed not only to apply an overall test to the network protector as a unit but to test the various components of the network protector.

It is, therefore, an object of the invention to provide improved testing equipment for polyphase electrical apparatus.

It is a further object of the invention to provide a testing device for testing a polyphase network protector while the protector is subjected to polyphase energization.

Other objects of the invention will be apparent from the following description, taken in conjunction with the accompanying drawings, in which.

Figure 1:
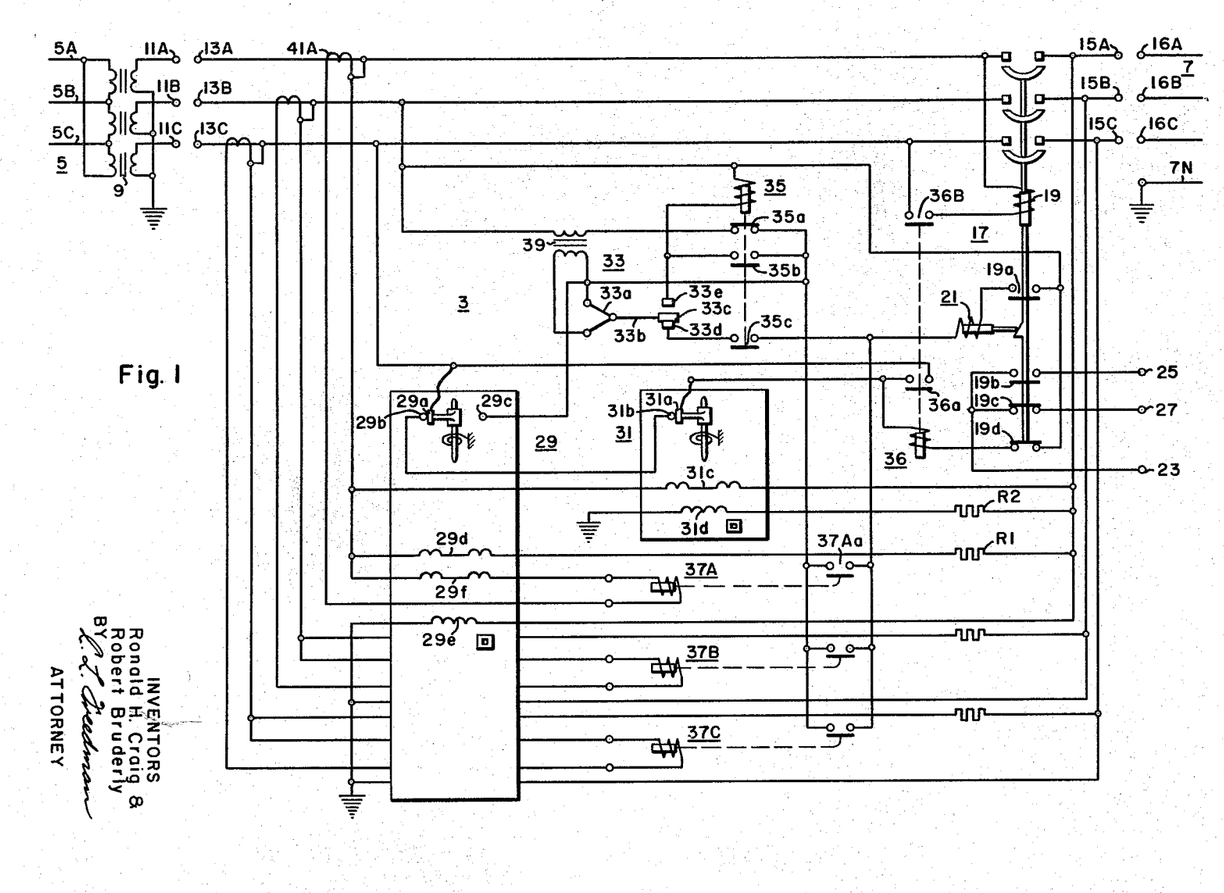
FIG. 1 is a schematic view of a network protector which may be tested by testing equipment embodying the invention.

Referring to the drawings, FIG. 1 shows a network protector 3 for controlling the connection of a feeder circuit 5 to a network circuit or grid 7. It will be understood that the network circuit or grid 7 is energized from a plurality of feeder circuits through protectors which are similar to the feeder circuit 5 and the protector 3 of FIG. 1.

The feeder circuit 5 is illustrated as a three-phase feeder circuit having phase conductors 5A, 5B and 5C. These phase conductors are connected to the primary windings of a polyphase transformer 9, the primary windings being illustrated as delta connected.

The secondary windings of the transformer 9 are illustrated as connected in star with a grounded neutral. The line terminals of the secondary windings are connected respectively to the terminals 11A, 11B and 11C.

The network protector 3 has transformer terminals 13A, 13B and 13C which are connected respectively to the terminals 11A, 11B and 11C by removable links when the network protector is in operative condition. It will be assumed for present purposes that these links have been removed to isolate the terminals 13A, 13B and 13C from the transformer 9.

The network protector 3 also has network terminals 15A, 15B and 15C. When the network protector is in operative condition, these terminals are connected through removable fuses to corresponding terminals 16A, 16B and 16C of the network circuit or grid 7. The network circuit or grid 7 also may include a neutral conductor 7N which is grounded. In FIG. 1 the fuses are assumed to be removed.

The terminals 13A, 13B and 13C are connected respectively to the terminals 15A, 15B and 15C through the three poles of a polyphase circuit breaker 17. The circuit breaker includes a closing coil 19 which may be energized to close the circuit breaker. The circuit breaker additionally has a trip coil 21 which may be energized to trip the circuit breaker. Operation of the circuit breaker acts to operate auxiliary or pallet switches 19a, 19b, 19c and 19d. The auxiliary switches 19a and 19b are open when the circuit breaker is open and are closed when the circuit breaker is closed. The auxiliary switches 19c and 19d are closed when the circuit breaker is open and are open when the circuit breaker is closed. The switches 19b and 19c control the connection of the terminal 23 respectively to a terminal 25 or a terminal 27. These terminals are employed in indicating condition of the circuit breaker in a manner which will be discussed below.

Various combinations of relays may be employed for controlling the circuit breaker 17. In the specific embodiment of the FIG. 1, a master relay 29, a phasing relay 31, a desensitizing relay 33 (which includes an auxiliary relay 35 and three instantaneous over-current relays 37A, 37B and 37C) are provided.

The master relay 29 has a movable contact 29a which may be moved from engagement with a closing contact 29b into engagement with a tripping contact 29c. The phasing relay 31 has a movable contact 31a which is movable into and out of engagement with a single contact 31b. With the contacts of the master and phasing relays in the position illustrated in FIG. 1, an energizing circuit is established for the auxiliary relay 36 which may be traced from the terminal 13C through the movable contact 29a, the fixed contact 29b, the fixed contact 31b, the movable contact 31a, the winding of the auxiliary relay 36, and the auxiliary switch 19d to the terminal 13B. Consequently when the network protector is connected for operation the relay 36 picks up to close its contacts 36a and 36b. The contacts 36a establish a holding circuit around the contacts of the phasing and master relays. The closure of the contacts 36b completes an energizing circuit for the closing coil 19 of the circuit breaker and the circuit breaker consequently closes.

Tripping of the circuit breaker requires that the contacts 29a and 29c of the master relay 29 engage to indicate that power is flowing from the network circuit or grid to the feeder circuit 5. If, at the same time, current in excess of a predetermined value flows through one of the phase conductors such as the phase conductor A, one of an instantaneous over-current relays such as the relay 37A picks up to close its contacts 37A*a*. This completes a tripping circuit for the circuit breaker which may be traced from the terminal 13C through the movable contact 29*a*, the fixed contact 29*c*, the contacts 37A*a*, the tripping coil 21 and the auxiliary switch 19*a* to the terminal 13B.

If none of the instantaneous over-current relays is picked up, the tripping circuit may be completed through contacts of the desensitizing or timing relay 33 and its auxiliary relay 35. Thus, when the movable contact 29*a* engages the fixed contact 29*c* of the master relay 29, a circuit is established through break contacts 35*a* of the auxiliary relay 35 for connecting the primary winding of a transformer 39 across the terminals 13B and 13C. The secondary winding of the transformer 39 is connected across the heater 33*a* of a bi-metallic element 33*b*. In response to heat from the heating element 33*a*, the relay 33 moves a movable contact 33*c* from engagement with a fixed contact 33*d* into engagement with a fixed contact 33*e*. The latter engagement completes with the closed contacts 29*a* and 29*c* a circuit connecting the winding of the relay 35 across the terminals 13B and 13C. The relay 35 now picks up to open the energizing circuit for the transformer 39 and this discontinues the heating of the bi-metallic element 33*b*. In addition, the relay 35 closes its make contacts 35*b* to establish a holding circuit around the contacts 33*c* and 33*e*. Closure of the make contacts 35*c* has no effect at this time.

As the bi-metallic element 33*b* cools, the movable contact 33*c* moves toward the fixed contact 33*d*. If, at any time, the contacts 29*a* and 29*c* separate, the relay 35 is reset and tripping of the circuit breaker does not take place. However, if these contacts remain in engagement, the contact 33*c* finally engages 33*d* to complete a tripping circuit for the circuit breaker which may be traced from the terminal 13C through the movable contact 29*a*, the fixed contact 29*c*, the bi-metallic element 33*b*, the movable contact 33*c*, the fixed contact 33*d*, the contacts 35*c*, the trip coil 21, and the auxiliary switch 19*a* to the terminal 13B.

The master relay 29 is a conventional three-phase relay. The windings for only one phase of this relay are illustrated in FIG. 1. It will be understood, however, that the relay has similar windings associated with each of the phases. It will be noted that the master relay 29 has phasing windings 29*d* connected between the terminals 13A and 15A through a suitable resistor R. The relay also has a voltage winding 29*e* connected between the terminal 15A and ground. Finally, the relay 29 has current windings 29*f* connected in series with the coil of the relay 37A across the secondary winding of a current transformer 41A which is associated with the phase conductor A connected to the terminal 13A.

The phasing relay 31 has a phasing winding 31*c* connected between the terminals 13A and 15A. A voltage winding 31*d* is connected between the terminal 15A and ground through a suitable resistor R2. The phasing relay is a single phase relay.

The components shown in FIG. 1 are well known in the art. A discussion of these components will be found in a book entitled "Silent Sentinels" published by the Westinghouse Electric Corporation of Newark, New Jersey, in 1949. In this book, the master, phasing and desensitizing relays are identified respectively as types CN33, CNJ and BN relays.

Figure 3:
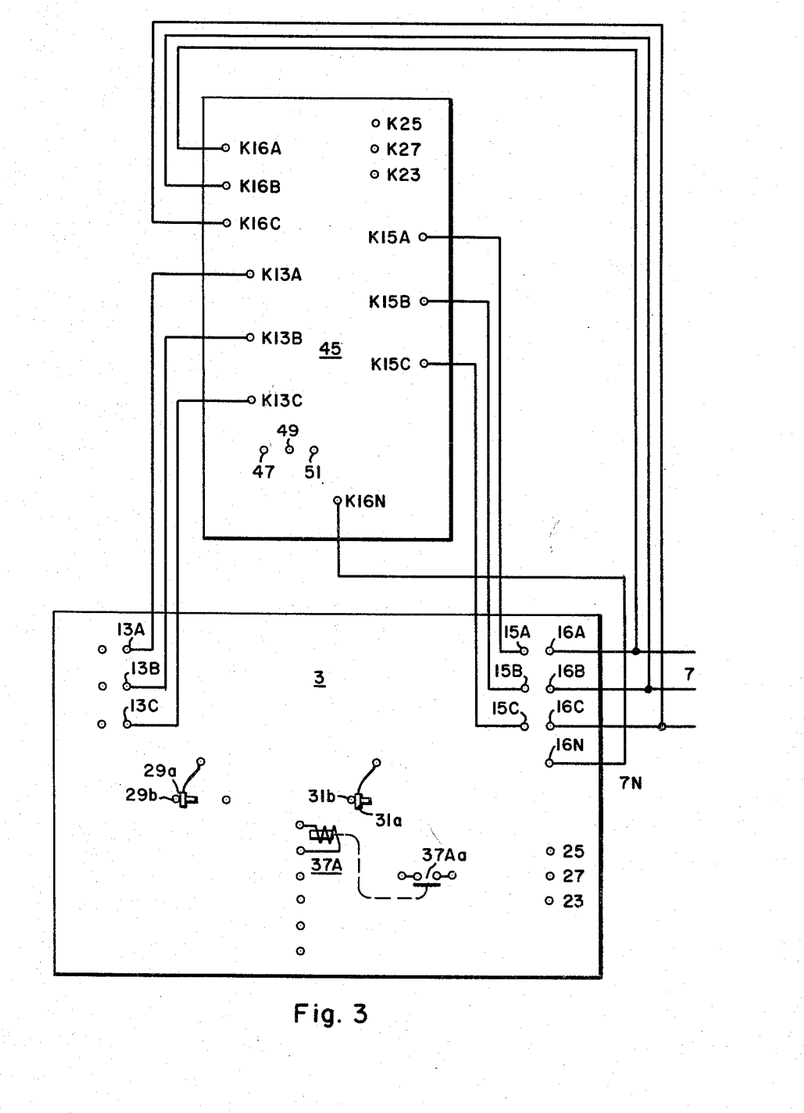
FIG. 3 is a schematic view showing the testing equipment of FIG. 2 associated with the network protector of FIG. 1.

FIG. 3 shows the network protector 3 associated with testing equipment in the form of a test kit 45. This test kit is designed to provide suitable voltages and currents to the network protector for the purpose of testing the network protector. In addition, the test kit provides indicators for indicating the performance of the network protector.

Connections are established between the network protector and the test kit by suitable conductors. Thus, the test kit 45 has three terminals K15A, K15B and K15C which are connected respectively to the terminals 15A, 15B and 15C of the network protector. Also the test kit has three terminals K13A, K13B and K13C which are connected respectively to the terminals 13A, 13B and 13C of the network protector. Power for the test kit 45 is derived from the network circuit or grid 7 through terminals K16A, K16B and K16C which are connected respectively to the terminals 16A, 16B and 16C. It will be noted that the test kit also has a neutral terminal K16N. For systems having neutral conductors, the terminal K16N is connected to an approrpriate neutral terminal such as the terminal 16N of FIG. 3.

The conductors employed for establishing connections between the network protector and the test kit 45 may be of any suitable construction, preferably the conductors are permanently connected to the terminals of the test kit. The remaining ends of the conductors preferably have spring clips which may be readily attached to the appropriate terminals of the network protector.

By inspection of FIG. 3, it will be noted that the test kit 45 has three terminals K23, K27 and K25. These terminals are employed in the operation of certain indicators provided in the test kit and for some tests may be connected respectively to the terminals 23, 25 and 27 of the network protector. Switches are provided in the test kit for connecting a terminal 49 selectively to either a terminal 47 or a terminal 51. These terminals may be connected to suitable components of the network protector in testing procedures. These components will be described further below.

Figure 2:
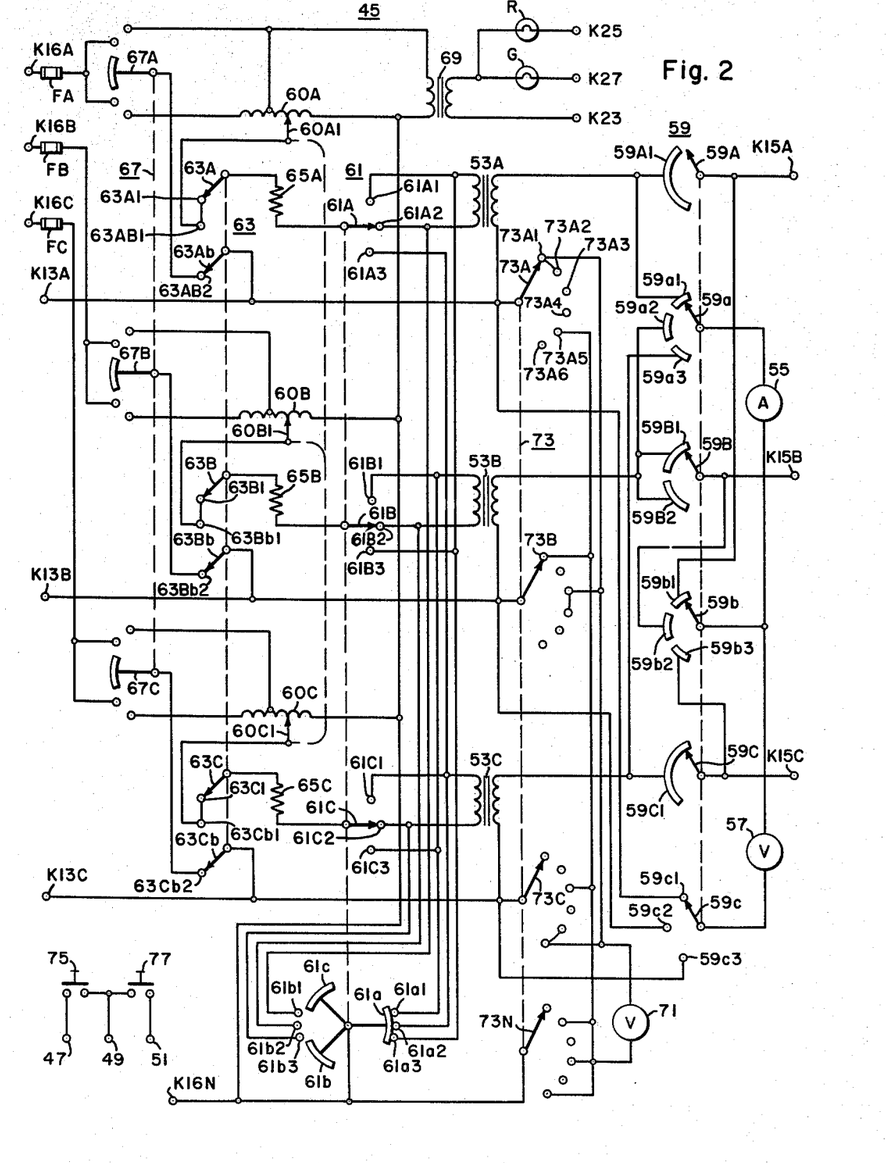
FIG. 2 is a schematic view of testing equipment embodying the invention.

Turning now to FIG. 2, three transformers 53A, 53B and 53C provide polyphase power for the network protector. To this end the secondary winding of the transformer 53A is connected across the terminals K13A and K15A. The transformers 53B and 53C are associated similarly with the terminals for the remaining phases B and C.

If desired, a separate ammeter may be incorporated in series with each of the secondary windings of the three transformers. Also a separate volt-meter may be connected across each of the secondary windings. In a preferred embodiment of the invention, a single ammeter 55 and a single volt-meter 57 are selectively connected in each of the phases by means of a suitable switch 59. This switch has switch arms which are ganged for simultaneous movement to any of three positions. The three switch arms 59A, 59B and 59C are connected respectively to the terminals K15A, K15B and K15C. Two of the switch arms 59*a* and 59*b* are connected respectively to the terminals of the ammeter 55. The voltmeter 57 is connected between the switch arm 59*b* and a switch arm 59*c*.

With the switch 59 in the position illustrated in FIG. 2, the ammeter 55 is connected in series with the secondary winding of the transformer 53A. The circuit may be traced from the upper terminal of the secondary winding of the transformer 53A through a contact segment 59*a*1 associated with the switch arm 59*a*, the ammeter 55, the switch arm 59*b*, and a contact segment 59*b*1 associated with the arm 59*b* to the terminal K15*a*.

Under these conditions the volt-meter 57 is connected across the secondary winding of the transformer 53A. This connection may be traced from the upper terminal of the secondary winding through the contact segment 59*a*1, the arm 59*a*, the ammeter 55, the volt-meter 57, the arm 59*c*, and a contact 59*c*1 associated with the arm 59*c* to the lower terminal of the secondary winding.

Let it be assumed that the switch 59 now is operated from the position illustrated in FIG. 2 to its mid-position. As the switch arms move the arm 59A first engages its contact segment 59A1 to maintain a closed circuit for the secondary winding of the transformer 53A. On continued motion of the arms, the arm 59*a* leaves the contact segment 59*a*1 and engages a contact segment 59*a*2. The arm 59B leaves its contact segment 59B1 and takes a position intermediate the two contact segments 59B1 and 59B2. The arm 59b engages a contact segment 59b2. The arm 59c engages a contact segment 59c2.

The ammeter 55 now is connected in series with the secondary winding of the transformer 53B. The volt-meter 57 now is connected across the secondary winding of this transformer. The circuit for the ammeter may be traced from the upper terminal of the secondary winding through the contact segment 59a2, the arm 59a, the ammeter 55, the arm 59b, the contact segment 59b2 to the terminals K15B. The circuit for the voltmeter may be traced from the upper terminal of the secondary winding through the contact segment 59a2, the arm 59a, the ammeter 55, the volt-meter 57, the arm 59c, and the contact 59c2 to the lower terminal of the secondary winding.

Next let it be assumed that the switch 59 is operated to its third position. The movement of the arms from their mid-positions first brings the arm 59B into engagement with the contact segment 59B2. This maintains continuity of the circuit for the secondary winding of the transformer 53B. Subsequently the arm 59a leaves the contact segment 59a2 and engages the contact segment 59a3. In a similar way the arm 59b engages the contact segment 59b3. The arm 59C leaves the contact segment 59C1. Finally the arm 59c engages the contact 59c3. The ammeter 55 now is connected in series with the secondary winding of the transformer 53C and the volt-meter 57 is connected across the secondary winding. A circuit for the ammeter may be traced from the upper terminal of the secondary winding of the transformer 53C through the contact segment 59a3, the arm 59a, the ammeter 55, the arm 59b, the contact segment 59b3 to the terminal K15C. The circuit for the volt-meter 57 may be traced from the upper terminal of the secondary winding of the transformer 53C through the contact segment 59a3, the arm 59a, the ammeter 55, the volt-meter 57, the arm 59c, and the contact 59c3 to the lower terminal of the secondary winding.

The primary windings of the three transformers 53A, 53B and 53C are energized in any suitable manner in accordance with the three phase voltages of the network circuit or grid 7. In a preferred embodiment of the invention, these primary windings are energized in accordance with the secondary voltage outputs of three auto-transformers 60A, 60B and 60C, under the control of two switches 61 and 63. The switch 61 has four arms which are ganged together for simultaneous movement to any of three positions. In the mid-positions illustrated the arms 61A, 61B and 61C engage respectively contacts 61A2, 61B2 and 61C2. The remaining arm is in the form of a drum having three contact segments 61a, 61b and 61c. In the mid-position of the switch illustrated in FIG. 2, the contact segment 61a connects three contacts 61a1, 61a2, and 61a3 to the neutral terminal K16N. When the arms 61A, 61B and 61C are moved to their upper positions as illustrated in FIG. 2, they engage respectively the contacts 61A1, 61B1 and 61C1. At the same time the contact segment 61a is moved out of engagement with its associated contacts and the contact segment 61c is moved into engagement with three contacts 61b1, 61b2 and 61b3 to connect these contacts to the neutral terminal K16N.

Arms 61A, 61B and 61C also may be moved into engagement respectively with the contacts 61A3, 61B3, and 61C3. At the same time the contact segment 61c is moved out of engagement with its associated contacts and the contact segment 61b moves into engagement with these contacts to maintain their connection to the neutral terminal K16N.

It will be noted that the terminals of the primary winding of the transformer 53A are connected to the contacts 61A1 and 61A2. The primary windings of the transformers 53B and 53C similarly are connected to associated contacts 61B1, 61B2 and 61C1, 61C2. It will be noted further that the contacts 61A1 and 61B3 are connected to the contact 61a3. The contact 61A2 is connected to the contact 61b1. The contacts 61A3 and 61C1 are connected to the contact 61a2. The contacts 61B1 and 61C3 are connected to the contact 61a1. The contact 61B2 is connected to the contact 61b2. Finally the contact 61C2 is connected to the contact 61b3.

Switch 63 has six arms 63A, 63Ab, 63B, 63Bb, 61C, 63Cb, which are ganged together for simultaneous movement between two positions. The arms 63A, 63B and 63C are shown in engagement with their single contacts 63A1, 63B1 and 63C1. The arms 63Ab, 63Bb, and 63Cb may be moved from engagement with contacts 63Ab2, 63Bb2 and 63Cb2 respectively into engagement with contacts 63Ab1, 63Bb1 and 63Cb1.

One terminal of each of the secondary windings for each of the auto-transformers 60A, 60B and 60C is connected to the neutral terminal K16N. The remaining terminals of the secondary windings are adjustable taps 60A1, 60B1 and 60C1 which are connected respectively to the switch arms 61A, 61B and 61C through switch arms 63A, 63B and 63C respectively and through resistors 65A, 65B and 65C respectively. The three taps are ganged together for simultaneous movement and consequently may adjust the primary voltages of the transformers 53A, 53B and 53C between zero and a suitable maximum value. The transformers may in turn step down the voltages applied to their primaries to values suitable for the tests hereinafter discussed.

Primary energizations for the auto-transformers 60A, 60B and 60C are controlled by a switch 67 having three arms 67A, 67B and 67C. These arms are connected respectively to the contacts 63Ab2, 63Bb2, and 63Cb2 and are ganged for simultaneous movement to any of three positions. In the positions illustrated in FIG. 2 the contact segments carried by the three arms are in their disconnected conditions. When the arms occupy their upper positions as viewed in FIG. 2, the arm 67A connects a portion of the primary winding of the transformer 60A between the neutral terminal K16N and the terminal K16A through a fuse FA. Such a connection is suitable for connecting the higher-voltage network protectors such as those designed for operation at 480 volts. It will be noted that the arm 67A is connected to the terminal K13A through the switch arm 63Ab.

When the switch arms 67A, 67B and 67C occupy their lower positions as viewed in FIG. 2, the entire primary winding of the auto-transformer 60A is connected between the neutral terminal K16N and the terminal K16A through the fuse FA. Such a connection is suitable for a protector designed for operation with a low voltage network circuit or grid such as one operating at 216 volts.

The arms 67B and 67C similarly control the energizations of their associated auto-transformers 60B and 60C from the terminals K16B and K16C respectively.

In order to indicate the condition of components of the network protector, suitable indicators are provided. Conveniently these take the form of a red lamp R and a green lamp G. Each of these lamps has a separate terminal connected to one of the terminals K25 and K27. The remaining terminals of the lamps are connected to one terminal of the secondary winding of a transformer 69. The remaining terminal of the secondary winding is connected to the terminal K23. The primary winding of the transformer 69 is connected for energiaztion across a portion of the winding of the auto-transformer 60A.

Voltages across any pair of terminals K13A, K13B and K13C and voltages between any of these terminals and the neutral terminal K16N may be measured. Although a separate volt-meter may be employed for each of these measurements preferably a single volt-meter 71 is selectively connected by means of a switch 73 to make any of these measurements.

The switch 73 has four switch arms 73A, 73B, 73C and 73N which are connected respectively to the terminals K13A, K13B, K13C and K16N. Each of the switch arms has associated therewith six contacts which are identified by the same reference character employed by the switch arm followed by a numeral suffix 1 to 6 to indicate the respective six contacts.

With the switch arms in the positions illustrated in FIG. 2, a volt-meter 71 is connected across the terminals K13A and K13B. If the arms are advanced one step, in a clockwise direction as viewed in FIG. 2, the volt-meter is connected to measure the voltage between the terminals K13A and K16N. By advancing the arms another step in the same direction, the volt-meter is connected to measure the voltage appearing across the terminals K13B and K13C. The next step of the arms connects the volt-meter 71 to measure the voltage between the terminals K13B and K16N. The fifth step connects the volt-meter to measure the voltage between the terminals 613A and 613C. In the sixth and final step the switch connects the volt-meter to measure the voltage appearing between the terminals K13C and K16N.

The instruments 55, 57 and 71 employed for measuring purposes may be of any suitable type. Conveniently, each of these may be a multi-range instrument.

For certain tests, manually-operated switches are provided in the test kit which may be connected to components of the network protector. To this end, a manually-operated switch 75 controls the connection of the terminal 47 to the terminal 49. In an analogous manner the manually-operated switch 77 controls the connection of the terminal 49 to the terminal 51.

In order to make certain that the applications of the test kit are understood, a number of typical test operations will be considered. For the first operation, it will be assumed that the network protector 3 is to have its closing characteristics tested. The network protector is connected to the test kit in the manner shown in FIG. 3. In addition, the terminals K25, K27 and K23 of the test kit are connected respectively to the terminals 25, 27 and 23 of the network protector. If the network protector is employed for a delta system having no neutral conductor, the terminal K16N is not connected to the network protector.

Turning now to FIG. 2, it will be assumed that the switches are in the positions illustrated in this figure. The switch 67 is first operated to the proper position for the voltage of the network protector. The transformers 53A, 53B and 53C now are energized with the proper polarity to produce a flow of power from the terminals 13A, 13B and 13C of the network protector to the terminals 15A, 15B and 15C. This is in the proper direction to produce a closing operation of the network protector. Inasmuch as the network protector circuit breaker is assumed to be open, the auxiliary switch 19c is closed and the light G of the test kit is illuminated.

The taps 60A1, 60B1 and 60C1 now are operated to increase the voltage applied to the transformers 53A, 53B and 53C and the voltage reading of the voltmeter 57 is read when the green lamp is extinguished and the red lamp R is illuminated to indicate that the circuit breaker has closed. It will be recalled that the voltmeter 57 may be connected across any of the secondary windings of the transformers 53A, 53B and 53C to read any of the three phasing voltages.

It will be assumed now that the tripping operation of the network protector is to be tested. The same connections and switch positions are employed for the tripping tests except that the switch 61 is operated to its upper position as viewed in FIG. 2. This reverses the polarity of the energization of the primary windings of the transformers 53A, 53B and 53C.

The power flow in the network protector now is from the terminals 15A, 15B and 15C toward the terminals 13A, 13B and 13C. This is in proper direction for the tripping operation of the network protector. Inasmuch as the circuit breaker is assumed to be closed, the red lamp R of the test kit is illuminated. The taps 60A1, 60B1, and 60C1 of the test kit now are operated to increase the current flowing through the network protector. This current may be read on the ammeter 55. It will be recalled that by manipulation of the switch 59, the ammeter may be connected to read the current flowing through any of the phase conductors. If a desensitizing relay such as the relay 33 is not employed by the network protector under test the applied voltage may be increased until the red lamp R is extinguished and the green lamp G is illuminated to indicate that the circuit breaker has tripped. The reading of the ammeter 55 then indicates the value of the reverse current required to trip the circuit breaker. If a desensitizing relay 33 is employed, each increase in the applied voltage should be applied for time sufficient to permit timing out of the desensitizing relay.

Let it be assumed next that the master relay 29 is to be tested. The connections are similar to those shown in FIG. 3. In addition, the terminals K25 and K23 of the test kit are connected respectively to the contacts 29a and 29b of the network protector. The switch positions are similar to those shown in FIG. 2, except that the switch 67 is operated for the proper voltage rating of the network protector to energize the auto-transformers 60A, 60B and 60C.

It will be recalled that the volt-meter 71 may be connected to read the voltage to neutral of any of the phase conductors connected to the terminals K13A, K13D and K13C. Consequently, the volt-meter 71 reads the voltage across any voltage coil of the master relay.

The volt-meter 57 reads the voltage across the secondary winding of the transformers 53A, 53B and 53C. Consequently, the volt-meter 57 reads the voltage across any of the phasing windings of the phasing windings of the master relay.

The taps 60A1, 60B1 and 60C1 now are operated to increase the voltage applied to the network protector until the contacts 29a and 29b engage, at which time the red lamp of the test kit glows. Consequently, the network protector may be adjusted to produce closing of the master relay at the desired phasing voltage.

If the tripping operation of the master relay is to be studied, the terminals K25 and K23 of the test kit may be connected across the contacts 29a and 29c, of the master relay. The switch 61 then is operated to its upper position as viewed in FIG. 2 to reverse the polarity of the energization of the transformers 53A, 53B and 53C. The test kit now directs current through the network protector in proper direction to produce a tripping operation of the master relay. The current may be increased by operation of the tabs 60A1, 60B1 and 60C1 until the red lamp R glows to indicate closure of the master relay tripping contacts. The ammeter 55 then indicates the minimum current at which tripping occurs.

In order to test the phasing relay 31, the connections of FIG. 3 again are employed and the terminals K25 and K23 now are connected respectively to the contacts 31b and 31a of the phasing relay. The switches are in the positions illustrated in FIG. 2 except that the switch 67 is operated to connect the auto-transformers for energization.

The taps 60A1, 60B1 and 60C1 now may be operated to increase the phasing voltage until the red lamp R glows to indicate operation of the CNJ relay. The voltages may be read in the manner previously discussed.

In this test of the CNJ relay, the potential coil voltage and the phasing coil voltage are in phase. In some installations, a characteristic curve is employed for the phasing relay which makes it advisable to apply a testing voltage through the transformers 53A, 53B and 53C which leads the voltages applied to the potential coils of the relays by 60 degrees. Such a phase displacement is available in response to movement of the switch 61 to its lower position as viewed in FIG. 2. For example, movement of the switch arm 61A to its lower position connects the upper terminal of the primary winding of the transformer 53C to the tap 60A1 for energization from the auto-transformer 60A with proper polarity to give the 60 degree leading phase angle.

If the operation of the desensitizing relay is to be tested separately, the connections of FIG. 3 may be employed and the terminals K27 and K23 may be connected across the contacts 37A*a*. In addition a jumper is connected between the contacts 29*a* and 29*c*. The position of the switches of the test kits are similar to those employed for testing the tripping operation of the network protector as previously described. When the auto-transformers 60A, 60B and 60C are initially energized, the timing of the desensitizing relay 33 promptly starts and when the relay times out the green lamp G glows to indicate completion of the timing operation.

If the operation of the over-current relay 37A is to be studied, the connections of FIG. 3 are employed except that the connections of the terminals K13A, K13B and K13C and the terminals K15A, K15B and K15C are removed. The contacts 37A*a* are connected across the terminals K27 and K23. The switches of the test kit are as shown in FIG. 2 except that the switch 67 is operated to energize the auto-transformers. The taps are now operated to increase the voltage output of the auto-transformers 60A, 60B and 60C. However, only the output of the auto-transformer 60A is effective for energizing the coil of the relay 37A through the transformer 53A. When the relay 37A picks up, the green lamp G glows and the voltage applied to the relay may be measured by the volt-meter 57.

When components of the mechanism of the network protector are to be tested, the switch 63 of the test kit may be operated to its upper position as viewed in FIG. 2. It will be noted that this manipulation of the switch connects the taps 60A1, 60B1 and 60C1 respectively to the terminals K13A, K13B and K13C. Consequently, the volt-meter 71 measures the voltage applied to these terminals from the auto-transformers and such voltage may be employed for testing the various components such as the trip mechanism and the closing mechanism of the circuit breaker. For this test, the master phasing and desensitizing relays may be removed. In order to energize the tripping and closing coils of the circuit breaker, the terminal 49 of the test kit may be connected to the terminal 13C of the protector. The terminal 47 of the test kit may be connected to the left-hand terminal of the trip coil 21 as viewed in FIG. 1. The terminal 51 of the test kit may be connected to the contact 31*a* of the phasing relay. Thus, operation of the switch 75 energizes the tripping coil of the breaker while energization of the switch 77 results in energization of the closing coil 19. In order to indicate the operation of the circuit breaker, the terminals K25, K27 and K23 of the test kit may be connected respectively to the terminals 25, 27 and 23 of the network protector.

Although the invention has been described with reference to certain specific embodiments thereof, numerous modifications embodying the invention are possible. Therefore, the foregoing description of the invention is to be taken in an illustrative sense rather than in a limiting sense.

We claim as our invention:

1. A polyphase electrical testing device comprising a first set of at least three terminals A, B and C each corresponding to one phase of a three-phase set, a second set of at least three terminals A1, B1 and C1 each corresponding to one phase of a three-phase set and a third set of at least three terminals A2, B2 and C2 each corresponding to one phase of a three-phase set, energizing means responsive to energization of the first set of terminals with three-phase voltage for producing three-phase voltage of adjustable magnitude between the second and third sets of terminals, said energizing means including three-phase transformer means having three phase primary windings and three phase secondary windings, connecting means connecting the transformer means for energizing the primary windings from the first set of terminals and for connecting the secondary windings to deliver a first phase voltage between the terminals A1 and A2, a second phase voltage across the terminals B1 and B2 and a third phase voltage across the terminals C1 and C2, said energizing means including means operable for adjusting the magnitudes of said first, second and third phase voltages, said energizing means including switching means manually operable for reversing the polarity of said first, second and third phase voltages, whereby three-phase current may be caused to flow selectively in either of two directions at a given instant through an electrical system connected between the second and third sets of terminals by manipulation of said switching means.

2. A polyphase electrical testing device comprising a first set of at least three terminals A, B and C each corresponding to one phase of a three-phase set, a second set of at least three terminals A1, B1 and C1 each corresponding to one phase of a three-phase set and a third set of at least three terminals A2, B2 and C2 each corresponding to one phase of a three-phase set, energizing means responsive to energization of the first set of terminals with three-phase voltage for producing three-phase voltage of adjustable magnitude between the second and third sets of terminals, said energizing means including three-phase transformer means having three phase primary windings and three phase secondary windings, connecting means connecting the transformer means for energizing the primary windings from the first set of terminals and for connecting the secondary windings to deliver a first phase voltage between the terminals A1 and A2, a second phase voltage across the terminals B1 and B2 and a third phase voltage across the terminals C1 and C2, said energizing means including means operable for adjusting the magnitudes of said first, second and third phase voltages, said energizing means including switching means manually operable for reversing the polarity of said first, second and third phase voltages, whereby three-phase current may be caused to flow selectively in either of two directions at a given instant through an electrical system connected between the second and third sets of terminals by manipulation of said switching means, said energizing means including transformer couplings for electrically isolating the second and third sets of terminals from the first set of terminals, and circuit means responsive to energization of the first set of terminals for applying three-phase voltage to the second set of terminals.

3. A polyphase electrical testing device comprising a first set of at least three terminals A, B and C each corresponding to one phase of a three-phase set, a second set of at least three terminals A1, B1 and C1 each corresponding to one phase of a three-phase set and a third set of at least three terminals A2, B2 and C2 each corresponding to one phase of a three-phase set, energizing means responsive to energization of the first set of terminals with three-phase voltage for producing three-phase voltage of adjustable magnitude between the second and third sets of terminals, said energizing means including three-phase transformer means having three phase primary windings and three phase secondary windings, connecting means connecting the transformer means for energizing the primary windings from the first set of terminals and for connecting the secondary windings to deliver a first phase voltage between the terminals A1 and A2, a second phase voltage across the terminals B1 and B2 and a third phase voltage across the terminals C1 and C2, said energizing means including means operable for adjusting the magnitudes of said first, second and third phase voltages, said energizing means including switching means manually operable for reversing the polarity of said first, second and third phase voltages, whereby three-phase current may be cause to flow selectively in either of two directions at a given instant through an electrical system connected between the second and third sets of terminals by manipulation of said switching means, said energizing means including transformer couplings for electrically isolating the second and third sets of terminals from the first set of terminals, circuit means responsive to energization of the first set of terminals for applying three-phase voltage to the second set of terminals, measuring means, and switching means selectively operable for connecting the measuring means to measure any one of the three phases of a three-phase electrical quantity associated with the second set of terminals.

4. A polyphase electrical testing device comprising a first set of at least three terminals A, B and C each corresponding to one phase of a three-phase set, a second set of at least three terminals A1, B1, and C1 each corresponding to one phase of a three-phase set and a third set of at least three terminals A2, B2 and C2 each corresponding to one phase of a three-phase set, energizing means responsive to energization of the first set of terminals with three-phase voltage for producing three-phase voltage of adjustable magnitude between the second and third sets of terminals, said energizing means including three-phase transformer means having three phase primary windings and three phase secondary windings, connecting means connecting the transformer means for energizing the primary windings from the first set of terminals and for connecting the secondary windings to deliver a first phase voltage between the terminals A1 and A2, a second phase voltage across the terminals B1 and B2 and a third phase voltage across the terminals C1 and C2, said energizing means including means operable for adjusting the magnitudes of said first, second and third phase voltages, said energizing means including switching means manually operable for reversing the polarity of said first, second and third phase voltages, whereby three-phase current may be caused to flow selectively in either of two directions at a given instant through an electrical system connected between the second and third sets of terminals by manipulation of said switching means, said energizing means including transformer couplings for electrically isolating the second and third sets of terminals from the first set of terminals, circuit means responsive to energization of the first set of terminals for applying three-phase voltage to the second set of terminals, measuring means, switching means selectively operable for connecting the measuring means to measure any one of the three phases of a three-phase electrical quantity associated with the second set of terminals, said measuring means comprising a current-measuring device, switching means selectively operable for connecting the current-measuring device to measure current flowing through any one of the second set of terminals, a voltage-measuring device and switching means selectively operable for connecting the voltage-measuring device to measure voltage appearing between any pair of the second set of terminals.

5. A polyphase electrical testing device comprising a first set of at least three terminals A, B and C each corresponding to one phase of a three-phase set, a second set of at least three terminals A1, B1 and C1 each corresponding to one phase of a three-phase set and a third set of at least three terminals A2, B2 and C2 each corresponding to one phase of a three-phase set, energizing means responsive to energization of the first set of terminals with three-phase voltage for producing three-phase voltage of adjustable magnitude between the second and third sets of terminals, said energizing means including three-phase transformer means having three phase primary windings and three phase secondary windings, connecting means connecting the transformer means for energizing the primary windings from the first set of terminals and for connecting the secondary windings to deliver a first phase voltage between the terminals A1 and A2, a second phase voltage across the terminals B1 and B2 and a third phase voltage across the terminals C1 and C2, said energizing means including means operable for adjusting the magnitudes of said first, second and third phase voltages, said energizing means incluuding switching means manually operable for reversing the polarity of said first, second and third phase voltages, whereby three-phase current may be caused to flow selectively in either of two directions at a given instant through an electrical system connected between the second and third sets of terminals by manipulation of said switching means, said energizing means including transformer couplings for electrically isolating the second and third sets of terminals from the first set of terminals, circuit means responsive to energization of the first set of terminals for applying three-phase voltage to the second set of terminals, measuring means, switching means selectively operable for connecting the measuring means to measure any one of the three phases of a three-phase electrical quantity associated with the second set of terminals, said measuring means comprising a current-measuring device, switching means selectively operable for connecting the current-measuring device to measure current flowing through any one of the second set of terminals, a voltage-measuring device, switching means selectively operable for connecting the voltage-measuring device to measure voltage appearing between any pair of the second set of terminals, a fourth set of three terminals, switching means selectively operable for connecting one of the fourth set of terminals to either of the other terminals in the fourth set, a fifth set of three terminals, first and second electroresponsive indicating devices, means responsive to connection of a first pair of the fifth set of terminals for operating the first electroresponsive indicating device and to connection of a second pair of the fifth set of terminals for operating second electroresponsive indicating device.

6. A polyphase electrical testing device comprising a first set of at least three terminals A, B and C each corresponding to one phase of a three-phase set, a second set of at least three terminals A1, B1 and C1 each corresponding to one phase of a three-phase set and a third set of at least three terminals A2, B2 and C2 each corresponding to one phase of a three-phase set, energizing means responsive to energization of the first set of terminals with three-phase voltage for producing three-phase voltage of adjustable magnitude between the second and third sets of terminals, said energizing means including three-phase transformer means having three phase primary windings and three phase secondary windings, connecting means connecting the transformer means for energizing the primary windings from the first set of terminals and for connecting the secondary windings to deliver a first phase voltage between the terminals A1 and A2, a second phase voltage across the terminals B1 and B2 and a third phase voltage across the terminals C1 and C2, said energizing means including means operable for adjusting the magnitudes of said first, second and third phase voltages, said energizing means including switching means manually operable for reversing the polarity of said first, second and third phase voltages, whereby three-phase current may be caused to flow selectively in either of two directions at a given instant through an electrical system connected between the second and third sets of terminals by manipulation of said switching means, said switching means being further operable for establishing a third phase of the last-named three-phase voltage which differs from the phases of said reversely-related polarities.

7. A polyphase electrical testing device comprising a first set of at least three terminals, a second set of at least three terminals and a third set of at least three terminals, energizing means responsive to energization of the first set of terminals with three-phase voltage for producing three-phase voltage of adjustable magnitude between the second and third sets of terminals, said energizing means comprising adjustable three-phase autotransformer means having primary windings and secondary windings, connections for applying three-phase energization from the first set of terminals to the primary windings, three-phase transformer means having primary windings insulated from secondary windings, connections for applying three-phase energization to the last-named primary windings from the first-named secondary windings, and connections for connecting each of the three secondary windings of the last-named transformer means across a separate one of the second set of terminals and a separate one of the third set of terminals, switching means manually operable for reversing polarity applied by each of the last-named secondary windings across the associated terminals whereby three-phase current may be caused to flow selectively in either of two directions at a given instant through an electrical system connected between the second and third sets of terminals by manipulation of said switching means, said energizing means including transformer couplings for electrically isolating the second and third sets of terminals from the first set of terminals, circuit means responsive to energization of the first set of terminals for applying three phase voltage to the second set of terminals, measuring means, switching means selectively operable for connecting the measuring means to measure any one of the three phases of a three-phase electrical quantity associated with the second set of terminals, said measuring means comprising a current-measuring device, switching means selectively operable for connecting the current-measuring device to measure current flowing through any one of the second set of terminals, a voltage-measuring device, switching means selectively operable for connecting the voltage-measuring device to measure voltage appearing between any pair of the second set of terminals, a fourth set of three terminals, switching means selectively operable for connecting one of the fourth set of terminals to either of the other terminals in the fourth set, a fifth set of three terminals, first and second electroresponsive indicating devices, means responsive to connection of a first pair of the fifth set of terminals for operating the first electroresponsive indicating device and to connection of a second pair of the fifth set of terminals for operating the second electroresponsive indicating device.

8. A polyphase electrical testing device comprising a first set of three terminals A, B and C each corresponding to one phase of a three-phase set, a second set of three terminals A1, B1 and C1 each corresponding to one phase of a three-phase set and a third set of three terminals A2, B2 and C2 each corresponding to one phase of a three-phase set, first three-phase transmission means for transmitting three-phase energy from the first set of three terminals to the second set of three terminals, whereby a three-phase device to be tested may be connected between the second and third sets of terminals to receive three-phase energization through the transmission means from a three-phase source of electric energy connected to the first set of terminals, said transmission means comprising three-phase transformer means having three-phase primary windings connected for three-phase energization from the first set of terminals and three-phase secondary windings, three-phase switch means for transmitting three-phase voltage from the secondary windings across the second and third sets of terminals, said switch means connecting a first phase of the secondary winding across the terminals A1 and A2, a second phase of the secondary windings across the terminals B1 and B2 and a third phase of the secondary windings across the terminals C1 and C2, whereby a three-phase current is directed through a three-phase device to be tested which is connected across the second and third sets of terminals, means effective when a three-phase voltage is present at the first set of terminals for deriving therefrom a three-phase voltage at the second set of terminals, said switch means including a three-phase reversing switch for controlling the direction of power flow through a three-phase device to be tested which is connected between the second and third sets of terminals, said switch being operable from a first to a second condition for reversing the direction of said power flow, said switch being operable to a third condition, and phase-modifying means responsive to operation of the switch to said third condition for deriving from a three-phase voltage applied to the first terminals, a three-phase voltage applied between said second and third sets of terminals which differs in phase from the phases present across the second and third sets of terminals when said switch is in its first and second conditions.

9. A polyphase electrical testing device comprising a first set of three terminals A, B and C each corresponding to one phase of a three-phase set, a second set of three terminals A1, B1 and C1 each corresponding to one phase of a three-phase set and a third set of three terminals A2, B2 and C2 each corresponding to one phase of a three-phase set, first three-phase transmission means for transmitting three-phase energy from the first set of three terminals to the second set of three terminals, whereby a three-phase device to be tested may be connected between the second and third sets of terminals to receive three-phase energization through the transmission means from a three-phase source of electric energy connected to the first set of terminals, said transmission means comprising three-phase transformer means having three-phase primary windings connected for three-phase energization from the first set of terminals and three-phase secondary windings, three-phase switch means for transmitting three-phase voltage from the secondary windings across the second and third sets of terminals, said switch means connecting a first phase of the secondary winding across the terminals A1 and A2, a second phase of the secondary windings across the terminals B1 and B2 and a third phase of the secondary windings across the terminals C1 and C2, whereby a three-phase current is directed through a three-phase device to be tested which is connected across the second and third sets of terminals, means effective when a three-phase voltage is present at the first set of terminals for deriving therefrom a three-phase voltage at the second set of terminals, said switch means including a three-phase reversing switch for controlling the direction of power flow through a three-phase device to be tested which is connected between the second and third sets of terminals, said switch being operable from a first to a second condition for reversing the direction of said power flow, said transformer means being adjustable to vary the effective three-phase transformer ratio thereof.

10. A polyphase electrical testing device comprising a first set of three terminals A, B and C each corresponding to one phase of a three-phase set, a second set of three terminals A1, B1 and C1 each corresponding to one phase of a three-phase set and a third set of three terminals A2, B2 and C2 each corresponding to one phase of a three-phase set, first three-phase transmission means for transmitting three-phase energy from the first set of three terminals to the second set of three terminals, whereby a three-phase device to be tested may be connected between the second and third sets of terminals to receive three-phase energization through the transmission means from a three-phase source of electric energy connected to the first set of terminals, said transmission means comprising three-phase transformer means having three-phase primary windings connected for three-phase energization from the first set of terminals and three-phase secondary windings, three-phase switch means for transmitting three-phase voltage from the secondary windings across the second and third sets of terminals, said switch means connecting a first phase of the secondary winding across the terminals A1 and A2, a second phase of the secondary windings across the terminals B1 and B2 and a third phase of the secondary windings across the terminals C1 and C2, whereby a three-phase current is directed through a three-phase device to be tested which is connected across the second and third sets of terminals, means effective when a three-phase voltage is present at the first set of terminals for deriving therefrom a three-phase voltage at the second set of terminals, said switch means including a three-phase reversing switch for controlling the direction of power flow through a three-phase device to be tested which is connected between the second and third sets of terminals, said switch being operable from a first to a second condition for reversing the direction of said power flow, three-phase switching means operable for varying the effective numbers of turns in the primary windings of said transformer means, and three-phase switching means operable for varying the effective numbers of turns in said secondary windings.

11. A polyphase electrical testing device comprising a first set of three terminals A, B and C each corresponding to one phase of a three-phase set, a second set of three terminals A1, B1 and C1 each corresponding to one phase of a three-phase set and a third set of three terminals A2, B2 and C2 each corresponding to one phase of a three-phase set, first three-phase transmission means for transmitting three-phase energy from the first set of three terminals to the second set of three terminals, whereby a three-phase device to be tested may be connected between the second and third sets of terminals to receive three-phase energization through the transmission means from a three-phase source of electric energy connected to the first set of terminals, said transmission means comprising three-phase transformer means having three-phase primary windings connected for three-phase energization from the first set of terminals and three-phase secondary windings, three-phase switch means for transmitting three-phase voltage from the secondary windings across the second and third sets of terminals, said switch means connecting a first phase of the secondary winding across the terminals A1 and A2, a second phase of the secondary windings across the terminals B1 and B2 and a third phase of the secondary windings across the terminals C1 and C2, whereby a three-phase current is directed through a three-phase device to be tested which is connected across the second and third sets of terminals, means effective when a three-phase voltage is present at the first set of terminals for deriving therefrom a three-phase voltage at the second set of terminals, said switch means including a three-phase reversing switch for controlling the direction of power flow through a three-phase device to be tested which is connected between the second and third sets of terminals, and auxiliary three-phase transformer means having primary windings and secondary windings insulated from each other, said auxiliary three-phase transformer means having primary windings coupled to the secondary windings of the first-named transformer means through the switch, and said auxiliary transformer means having secondary windings connected across said second and third sets of terminals, said switch being operable from a first to a second condition for reversing the direction of said power flow, three-phase switching means operable for varying the effective numbers of turns in the primary windings of said transformer means, and three-phase switching means operable for varying the effective numbers of turns in said secondary windings.

12. A polyphase electrical testing device comprising a first set of three terminals A, B and C each corresponding to one phase of a three-phase set, a second set of three terminals A1, B1 and C1 each corresponding to one phase of a three-phase set and a third set of three terminals A2, B2 and C2 each corresponding to one phase of a three-phase set, first three-phase transmission means for transmitting three-phase energy from the first set of three terminals to the second set of three terminals, whereby a three-phase device to be tested may be connected between the second and third sets of terminals to receive three-phase energization through the transmission means from a three-phase source of electirc energy connected to the first set of terminals, said transmission means comprising three-phase transformer means having three-phase primary windings connected for three-phase energization from the first set of terminals and three-phase secondary windings, three-phase switch means for transmitting three-phase voltage from the secondary windings across the second and third sets of terminals, said switch means connecting a first phase of the secondary winding across the terminals A1 and A2, a second phase of the secondary windings across the terminals B1 and B2 and a third phase of the secondary windings across the terminals C1 and C2, whereby a three-phase current is directed through a three-phase device to be tested which is connected across the second and third sets of terminals, means effective when a three-phase voltage is present at the first set of terminals for deriving therefrom a three-phase voltage at the second set of terminals, said switch means including a three-phase reversing switch for controlling the direction of power flow through a three-phase device to be tested which is connected between the second and third sets of terminals, said switch being operable from a first to a second condition for reversing the direction of said power flow, and switch means operable for transferring the secondary windings of said transformer means to supply three-phase voltage from such windings to said second set of terminals.

References Cited in the file of this patent
UNITED STATES PATENTS

| 2,376,775 | Johnson | May 22, 1945 |
| 2,421,300 | Stephens | May 27, 1947 |
| 2,614,150 | Bucher | Oct. 14, 1952 |
| 2,724,782 | Holloway | Nov. 22, 1955 |